2,719,386

METHOD OF ELECTRICALLY HEATING AND WELDING GLASS ELEMENTS

Ralph A. Johnson, Port Allegany, and Reverdy E. Baldwin, Austin, Pa., assignors, by mesne assignments, to Pittsburgh Plate Glass Company, Pittsburgh, Pa., a corporation of Pennsylvania No Drawing. Application April 30, 1952, Serial No. 285,333

14 Claims. (Cl. 49—82)

The present invention relates to an electrically conductive solution and it has particular relation to the provision of an electrically conductive solution of colloidal graphite suitable for use in the production of all glass welded double glazed units.

It is known that welded double glazed units may be prepared by applying a stripe of an electrically conductive material such as aqueous colloidal graphite along the marginal edges of at least one of two sheets of glass, preheating the two sheets of glass, supporting the striped sheet in horizontal position above the other sheet, electrically heating the marginal edges of the glass sheets by passing an electric current through the stripes to generate heat sufficient to soften the contiguous glass and cause the edge portions of the upper sheet to drop down and weld to the marginal edges of the lower sheet. Suitable commercially available colloidal graphite solutions usually contain a small amount of sodium silicate.

One such method of forming welded glass double glazed units is described in U. S. Patents Nos. 2,389,360 and 2,394,051. A later and improved technique is disclosed in an application of William R. Clever and Harry O. Phalin filed March 14, 1950, Serial No. 149,562, now Patent No. 2,624,979 dated January 13, 1953, and entitled "Welded Double Glazing Unit," now U. S. Patent No. 2,624,979.

In the commercial production of welded double glazed units according to such methods, the stripe of colloidal graphite is applied to the glass sheet by means of a wheel and cup striping unit which comprises a striping wheel which rotates in a reservoir containing the colloidal graphite solution. The coated wheel deposits a stripe of the colloidal graphite solution on the surface of the glass sheet when the glass sheet and coated wheel are brought into contact with each other. Such a striping mechanism is described in a copending application of John Kallenborn, filed January 10, 1947, Serial No. 721,285, now Patent No. 2,597,106, dated May 20, 1952, entitled "Aquadag Stripe Applicator," now U. S. Patent No. 2,597,106.

In using such a mechanism to apply a stripe of electrically conductive material to a surface of a sheet of glass it can be seen that the viscosity of the solution is an important factor. One method which has been employed to control the viscosity of the striping solution is to add and aqueous solution of ammonium alignate to the aqueous solution of colloidal graphite. However, the use of ammonium alginate in combination with colloidal graphite has been unsatisfactory, both with respect to the physical uniformity of the stripe which is applied and with respect to the electrical resistance of the stripe, and frequent shut downs and delays in production have occurred. Other compounds used in combination with colloidal graphite which have not been satisfactory include ethyl cellulose, methyl cellulose, and polyvinyl butyral dissolved in denatured ethyl alcohol.

In accordance with the present invention an electrically conductive solution has been provided which is suitable for use in the production of all glass welded double glazed units. This electrically conductive solution comprises an aqueous solution of colloidal graphite and an alkali metal carboxyalkyl cellulose such as lithium, potassium or sodium carboxymethyl cellulose. The alkyl substituent may be methyl, ethyl propyl, isopropyl, butyl and higher alkyl radicals. The use of such an electrically conductive solution has resulted in production of more uniform stripes whose preheating, electrical resistance and welding qualities are excellent and easily reproducible. It has also been found that the storage in sealed containers of such striping solutions at temperatures just above their freezing temperature up to 60° F. with occasional agitation is beneficial in providing for the production of electrically conducting stripes of uniform thickness and electrical resistance.

In accordance with a further embodiment of this invention, it has been found that it is advantageous to use different formulations of the aqueous solution of colloidal graphite and sodium carboxymethyl cellulose when a double glazed unit of differing edge dimensions is being produced. For example, in the production of a rectangular double glazed unit, the ratio of colloidal graphite to sodium carboxymethyl cellulose in the solution should be greater for the stripes along the longer sides of the glass sheet than for the stripes along the shorter sides of the glass.

In the practice of the invention, an electrically conductive solution of colloidal graphite and sodium carboxymethyl cellulose is prepared in the following manner. Ten grams of sodium carboxymethyl cellulose is thoroughly mixed with 3000 cubic centimeters of distilled water. Sodium carboxymethyl cellulose is prepared by treating alkali cellulose with sodium monochloroacetate and is commercially available in various viscosities. The above formulation is prepared with sodium carboxymethyl cellulose of high viscosity grade.

The viscosity of the mixture of water and sodium carboxymethyl cellulose is measured at 25° C. and adjusted so as to be within desired viscosity limits. A viscosity range of 70 to 90 centipoises is preferred, but the appropriate viscosity is dependent upon many factors, such as the relative amount of striping solution which is added, the diameter of the striping wheel, conformation of the rim of the striping wheel, rate of rotation of the striping wheel, relative linear rates of travel of the glass sheets and striping wheels and many other factors. If the viscosity is too high, distilled water may be added to reduce the viscosity of the mixture. The addition of about 300 cubic centimeters of distilled water to 3000 cubic centimeters of solution as prepared above has been found to lower the viscosity of the solution about 10 centipoises.

As stated above, it has been discovered that optimum welding is achieved when the electrically conductive solution of colloidal graphite and sodium carboxymethyl cellulose is varied as to the amounts of each constituent as the length of the stripe to be applied varies. Accordingly, the following formulations have been found to produce optimum results when employed in the production of all glass welded double glazed units as hereinafter more fully described. The table below sets forth the amount of an aqueous solution of colloidal graphite containing 2 to 3 per cent by weight of graphite which is added to 150 cubic centimeters of a solution of sodium carboxymethyl cellulose prepared as described above to form electrically conductive stripes of varying lengths.

Table

| Length of Side in Inches | Cubic Centimeters of Aqueous Colloidal Graphite |
| --- | --- |
| 13 | 35–45 |
| 14 to 23 | 40–50 |
| 23 to 29 | 45–55 |
| 29 to 34 | 50–60 |
| 34 to 38 | 55–65 |
| 38 to 41 | 60–70 |
| 41 to 44 | 65–75 |
| 44 to 47 | 70–80 |
| 47 and longer | 75–85 |

It is important that the colloidal graphite solution, the sodium carboxymethyl cellulose and the electrically conductive solution made therefrom be kept at certain temperatures in order to provide an electrically conductive material which will act with maximum efficiency during the welding operation. It has been found that optimum results are obtained when the electrically conductive solution and ingredients therefore are stored at a temperature just above their freezing temperature up to 60° F. The viscosity of the electrically conductive solution when prepared and kept in this manner is very stable. Such a property is important when it is desired to formulate an electrically conducting solution which can be used in production extending over a period of time.

Various techniques may be employed to apply the electrically conducting stripes to the glass. For example, the stripes may be applied by painting, brushing, spraying screening or by other methods. One method which has been found to be superior to other known methods is to apply the stripes by means of a wheel which is supported in a reservoir containing the electrically conductive solution. This wheel may be independently driven, or may be caused to rotate by contact with the glass to provide a continuous electrically conductive stripe on the surface of the glass sheet. Said contact rotation of the wheel may be caused either by its movement across the surface of the glass or by movement of the glass sheet past the wheel or a combination of such movements. A suitable apparatus for applying the stripes of electrically conductive material to the glass sheet is described in the patent granted to John Kallenborn mentioned above.

It is extremely important that the glass to which the electrically conductive stripe is to be applied is as clean as possible. Any foreign substances on the surface of the glass in the area of the stripe are apt to cause irregular heating during the welding operation which may result in a breakdown. It has also been found that the temperature of the glass during the striping operation is a material consideration. Best results have been obtained when the temperature of the glass during the striping operation is within a range of 200 to 350° F.

After the margins of at least one of the glass sheets have been striped as desired with the electricity conducting solution of colloidal graphite and sodium carboxymethyl cellulose, the two sheets of glass to be welded are placed in a preheating furnace which brings the glass up to a temperature of approximately 1000 to 1100° F. preparatory to welding. This preheating constitutes a severe, but fundamental test of the suitability of any electrically conductive stripe. During this preheating, virtually all of the sodium carboxymethyl cellulose and any other organic constituent burn out leaving a graphite strip whose electrical characteristics approach those of a metallic ribbon of greatly reduced resistance. A uniform, complete removal of the sodium carboxymethyl cellulose is highly desirable. The air dried resistance of a colloidal graphite stripe should be such that after preheating, the resistance lies within the approximate range of 0.001 to 0.003 megohm per inch.

When the sheets of glass have been preheated at approximately 1100° F. for about 1 minute, they are then arranged in superposed relation and welded as described in U. S. Patents Nos. 2,389,360 and 2,394,051 and the patent granted to Clever et al. disclosed above. The preferred welding process requires nine heating cycles to complete the weld. One heating cycle comprises applying current to one pair of opposing parallel stripes and then to the other. The current is applied to the stripes by means of suitable electrodes positioned at each corner of the glass sheet as shown in the patents and pending application. Starting with an initial temperature of 1100° F., the temperature of the glass is gradually and substantially uniformly raised to about 1900 to 2000° F. This increase in temperature reaches a maximum in the area of the stripes of colloidal graphite, and is progressively lower towards the center of the sheets of glass. This maximum temperature is reached only after the stripes of graphite have been burned off and portions of the marginal edges of the upper sheet have softened and sagged down to engage the marginal edges of the lower sheet of glass.

After the glass sheets have been welded together to form the double glazed unit, the unit is annealed and cooled to room temperature. Then the moist air within the unit is purged by means of a dry humidified gas and the unit is sealed. Usually the units are prestressed prior to the sealing operation.

The use of an electrically conducting solution of colloidal graphite and sodium carboxymethyl cellulose has made possible the production of double glazed units on a commercial scale without the numerous production breakdowns caused by failure of the electrically conducting stripe during the initial stages of the welding operation. A greater degree of heating as well as a more uniform degree of heating of the marginal edges of the glass sheet containing the electrically conducting stripe during the early stages of the welding operation has been made possible by the use of such solution.

The graphite stripe as applied to the glass in combination with sodium carboxymethyl cellulose seems by visual observation to carry the heat into the glass better than when applied alone as an aqueous solution of colloidal graphite or in combination with any other compound which has been tested. On explanation of this might be that the particles of graphite are so aligned as to conduct current and pass heat more readily into the glass directly beneath and surrounding the stripe. The pattern of consistent decomposition of the sodium carboxymethyl cellulose to volatiles may contribute to the achievement of the proper alignment of the graphite particles.

Although the present invention has been described with reference to specific details of certain embodiments thereof, it is not intended that such details shall be regarded as limitations upon the scope of the invention except insofar as included in the accompanying claims.

We claim:

1. A method of producing an electrically welded double glazed unit which comprises providing two flat glass sheets, applying stripes of an electrically conducting solution comprising an aqueous solution of colloidal graphite and an alkali metal carboxyalkyl cellulose to the marginal edges of one of said glass sheets, the ratio of colloidal graphite to an alkali metal carboxyalkyl cellulose in the solution being greater as the length of stripe to be applied to the surface of the glass sheet is greater, preheating the glass sheets, superposing the glass sheets in spaced relation with the glass sheet containing the electrically conductive stripes being above the other sheet of glass, electrically heating the margins of the glass sheets to cause them to soften and weld together to form a double glazed unit and annealing the unit.

2. A method of producing an electrically welded double glazed unit which comprises providing two flat glass sheets, applying stripes of an electrically conducting solution comprising an aqueous solution of colloidal graphite and sodium carboxymethyl cellulose to the marginal edges of one of said glass sheets, the ratio of colloidal graphite to sodium carboxymethyl cellulose in the solution being greater as the length of stripe to be applied to the surface of the glass sheet is greater, preheating the glass sheets, superposing the glass sheets in spaced relation with the glass sheet containing the electrically conductive stripes being above the other sheet of glass, electrically heating the margins of the glass sheets to cause them to soften and weld together to form a double glazed unit and annealing the unit.

3. A method of producing an electrically welded rectangular double glazed unit which comprises providing two rectangularly shaped flat glass sheets, applying stripes of an electrically conducting solution comprising an aqueous solution of colloidal graphite and sodium carboxymethyl cellulose to the marginal edges of one of said glass sheets, the ratio of colloidal graphite to sodium carboxymethyl cellulose being greater for the two longer opposing parallel edge stripes than for the shorter opposing parallel edge stripes, preheating the glass, superposing the glass sheets in spaced relation with the glass sheet containing the electrically conductive stripes being above the other sheet of glass, electrically heating the margins of the upper glass sheet to cause them to soften and weld to the marginal edges of the lower glass sheet to form a double glazed unit and annealing the unit.

4. In the method of producing an electrically welded double glazed unit by applying stripes of an electrically conducting material to the marginal edges of a glass sheet, superposing the striped glass sheet in spaced relation to another glass sheet and electrically heating the marginal edges of the glass sheets to cause them to weld together, the step which comprises applying stripes of an electrically conducting solution comprising an aqueous solution of colloidal graphite and an alkali metal carboxyalkyl cellulose to the marginal deges of the glass sheet.

5. In the method of producing an electrically welded double glazed unit by applying stripes of an electrically conducting material to the marginal edges of a glass sheet, superposing the striped glass sheet in spaced relation to another glass sheet and electrically heating the marginal edges of the glass sheets to cause them to weld together, the step which comprises applying stripes of an electrically conducting solution comprising an aqueous solution of colloidal graphite and sodium carboxymethyl cellulose to the marginal edges of the glass sheet.

6. In the method of producing an electrically welded double glazed unit by applying stripes of an electrically conducting material to the marginal edges of a glass sheet, superposing the striped glass sheet in spaced relation to another glass sheet and electrically heating the marginal edges of the glass sheets to cause them to weld together, the step which comprises applying stripes of an electrically conducting solution comprising an aqueous solution of colloidal graphite and sodium carboxymethyl cellulose to the marginal edges of the glass sheet, the ratio of colloidal graphite to sodium carboxymethyl cellulose in the solution being greater as the length of stripe to be applied to the surface of the glass sheet is greater.

7. In the method of producing an electrically welded double glazed unit comprising applying stripes of an electrically conducting material to the marginal edges of a glass sheet, positioning the striped glass sheet in spaced relation to another glass sheet and electrically heating the marginal edges of the glass sheets to cause them to weld together, the step which comprises applying stripes of a solution comprising colloidal graphite and an alkali metal carboxyalkyl cellulose to the marginal edges of the glass sheet.

8. A method of producing an electrically welded multiple glazed unit which comprises applying to the marginal edges of at least one of the glass members forming the unit stripes of a solution comprising colloidal graphite and an alkali metal carboxyalkyl cellulose, positioning the striped member in spaced relation to another member and electrically heating the marginal edges of the members to cause them to weld together and form a multiple glazed unit.

9. The method described in claim 8 wherein the alkali metal carboxyalkyl cellulose is sodium carboxymethyl cellulose.

10. The method as described in claim 8 wherein the glass member is at a temperature between 200 to 350° F. at the time of application of the stripe of alkali metal carboxyalkyl cellulose.

11. A method of heating glass in a restricted area which comprises applying a solution comprising colloidal graphite and an alkali metal carboxyalkyl cellulose to the restricted area of the glass and passing electric current through the graphite to heat it and the glass adjacent thereto.

12. The method of claim 11 wherein the alkali metal carboxyalkyl cellulose is sodium carboxymethyl cellulose.

13. A method of producing an electrically welded glass structure which comprises applying a solution comprising an alkali metal carboxyalkyl cellulose and colloidal graphite to a restricted area on at least one of the glass members to form the structure, passing an electric current through the graphite to heat it and the glass adjacent thereto and contacting the heated glass with another member of the structure to weld them together.

14. The method described in claim 13 wherein the alkali metal carboxyalkyl cellulose is sodium carboxymethyl cellulose.

References Cited in the file of this patent

UNITED STATES PATENTS

| 2,176,879 | Bartell | Oct. 24, 1939 |
| 2,389,360 | Guyer et al. | Nov. 20, 1945 |
| 2,394,051 | Guyer et al. | Feb. 5, 1946 |
| 2,445,374 | Van Wyck | July 20, 1948 |
| 2,570,827 | Madison et al. | Oct. 9, 1951 |

FOREIGN PATENTS

| 665,474 | Germany | Sept. 26, 1938 |

OTHER REFERENCES

Hercules, "Sodium Carboxymethyl Cellulose," 1944, page 4.